United States Patent [19]
Hsieh

[11] Patent Number: 5,471,258
[45] Date of Patent: Nov. 28, 1995

[54] EYEGLASSES WITH A HAIR CLIP

[76] Inventor: Shou-Tun Hsieh, No. 16, Alley 191, Lane 174, An-Chung St. Tainan, Taiwan

[21] Appl. No.: 426,879

[22] Filed: Apr. 24, 1995

[51] Int. Cl.⁶ .................................................. G02C 5/14
[52] U.S. Cl. ........................... 351/123; 351/156; 351/158
[58] Field of Search ................................ 351/41, 52, 63, 351/111, 119, 123, 140, 156, 158

[56] References Cited

U.S. PATENT DOCUMENTS 5,355,185  10/1994  Lee ............................................ 351/123

Primary Examiner—William L. Sikes
Assistant Examiner—Huy Mai

[57] ABSTRACT

A pair of eyeglasses with a hair clip comprising a lens frame, two temples, and a detachable hair clip set combined together, the hair clip set consisting of a front elongate arm and two side arms pivotally combined with two ends of the front arm, the front arm normally placed in a lengthwise recess in an upper edge of the lens frame, the two side arms normally placed in a lengthwise recess in an inner upper edge of each temple, the rear end of each side arm pivotally connected with each temple so that the hair clip set may be swung up curvingly on the hairs of the head of a user.

2 Claims, 4 Drawing Sheets

EYEGLASSES WITH A HAIR CLIP

BACKGROUND OF THE INVENTION

This invention concerns a pair of eyeglasses with a hair clip, particularly the hair clip pivotally connected with two temples and able to be swung up from or down on a lens frame and two temples.

So far, there are no such eyeglasses with a hair clip in use or on market. Therefore, an extra hair clip has to be carried for protecting the hairs of the head of a person, with eyeglasses being worn separately.

SUMMARY OF THE INVENTION

A main object of this invention is to offer a pair of eyeglasses combined with a hair clip, having double functions.

A main feature of the present invention is a lens frame provided with a lengthwise recess on an upper inner edge for receiving a front arm of a hair clip set, and two temples each having a lengthwise recess for receiving a side arm of the hair clip set. The hair clip set can be swung up from or down on the lens frame and the two temples to position on the hairs of the head of a user, by means of a pivot connecting a rear end of each side arm with each temple.

DETAILED DESCRIPTION OF THE INVENTION

Figure 1:
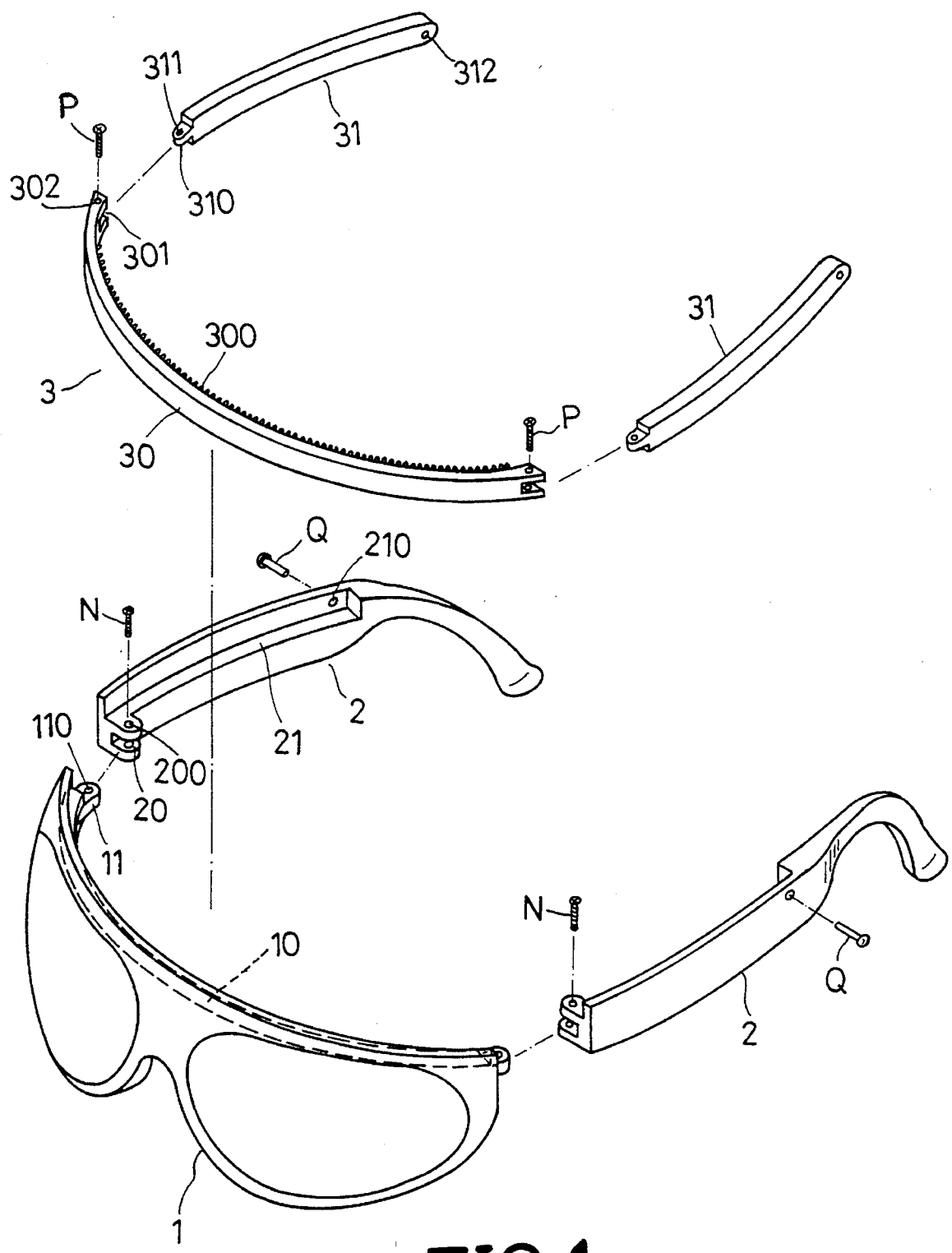
FIG. 1 is an exploded perspective view of eyeglasses with a hair clip in the present invention.

A pair of eyeglasses with a hair clip in the present invention, as shown in FIG. 1, comprises a lens frame 1, two temples 2, 2, and a hair clip set 3 combined together.

The lens frame 1 is curved, having an L-shaped lengthwise upper recessed edge 10, and a connect projection 11 with a vertical hole 110 respectively at two ends.

The two temples 2 have their front ends respectively provided with an aperture 20 defined by two sideway projections bored with vertical holes 200, a lengthwise upper recess 21, and a lateral hole 210 at a rear end of the recess 21. The two lengthwise recesses 21, 21 continue with two ends of the upper recessed edge 10 of the lens frame 1. The aperture 20 fits with the connect projection 11 of the lens frame 1.

The hair clip set 3 has a front elongate arm 30 and two side arms 31, 31 combined together. The front arm 30 is curved, having a plurality of combing teeth 300 on an inner side, an aperture 301 respectively defined by two projections in two ends, and a vertical hole 301 respectively in the two projections defining the aperture 301. The two side arms 31, 31 respectively have a projection 310 with a vertical hole 311 at a front end and a lateral hole 312 in a rear end. The projection 310 fits in the aperture 301.

Figure 2:
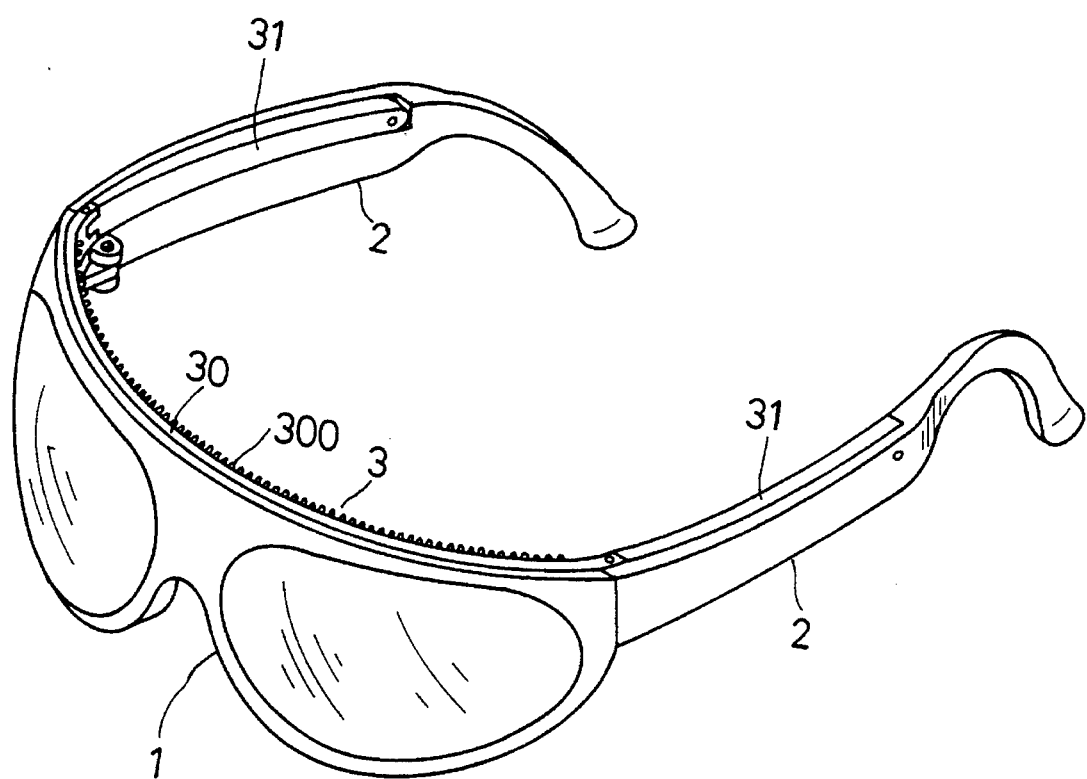
FIG. 2 is a perspective view of the eyeglasses with a hair clip in the present invention.

In assembling, referring to FIGS. 1 and 2, firstly, the two apertures 20 of the temples 2, 2 are made to fit with the projections 11, 11 of the lens frame 1, with the vertical holes 200, 200 aligned to the vertical holes 110, 110 and screwed together by means of screws N. Next, the two side arms 31, 31 are combined with the front arm 30, with the projections 310, 310 fitted in the apertures 301, 301 and each hole 311 aligned to each hole 302 and then screwed together by means of screws N. Finally, the combined hair clip set 3 is combined with the lens frame 1 and the two temples 2, 2, with the front arm 30 fitted in the recessed edge 10 and the two side arms 31, 31 fitted in the lengthwise recesses 21. 21, with the lateral holes 312, 312 aligned to the lateral holes 210, 210 and screwed together by means of screws Q, Q, finishing the assemblage.

Figure 3:
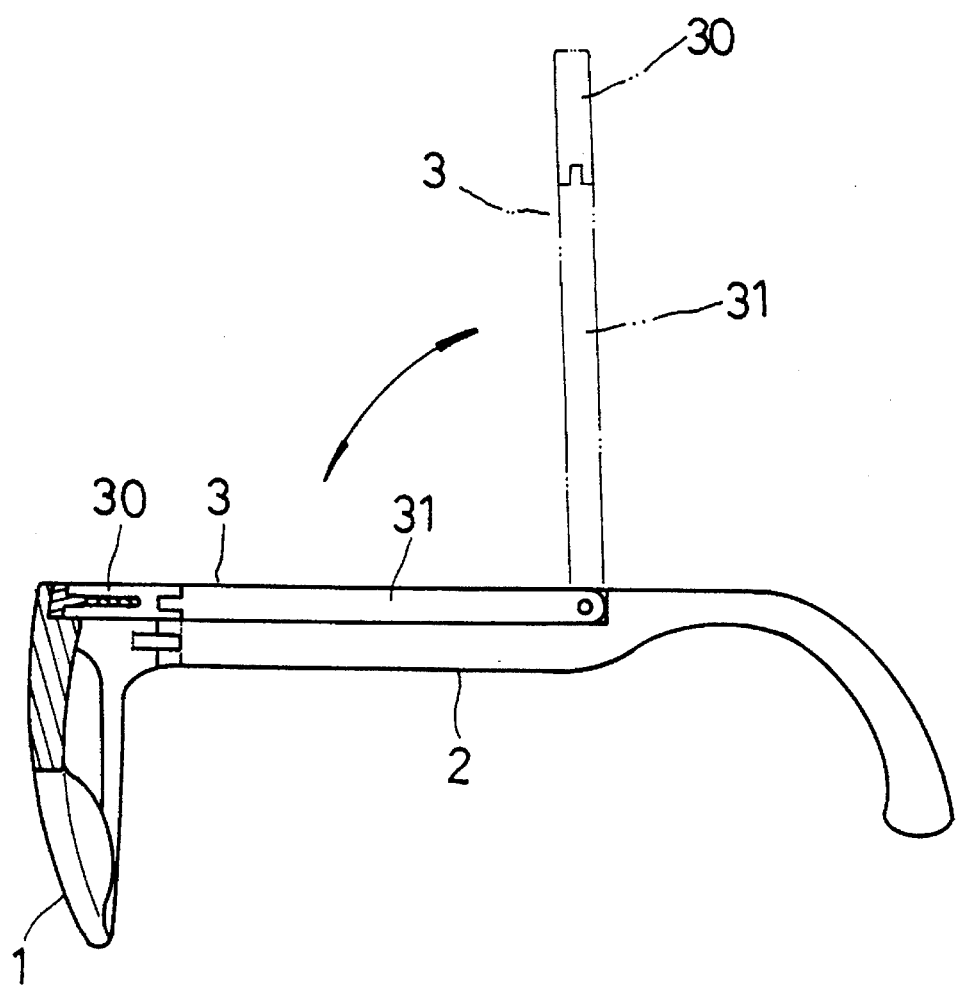
FIG. 3 is a side cross-sectional view of the eyeglasses with a hair clip in the present invention.
Figure 4:
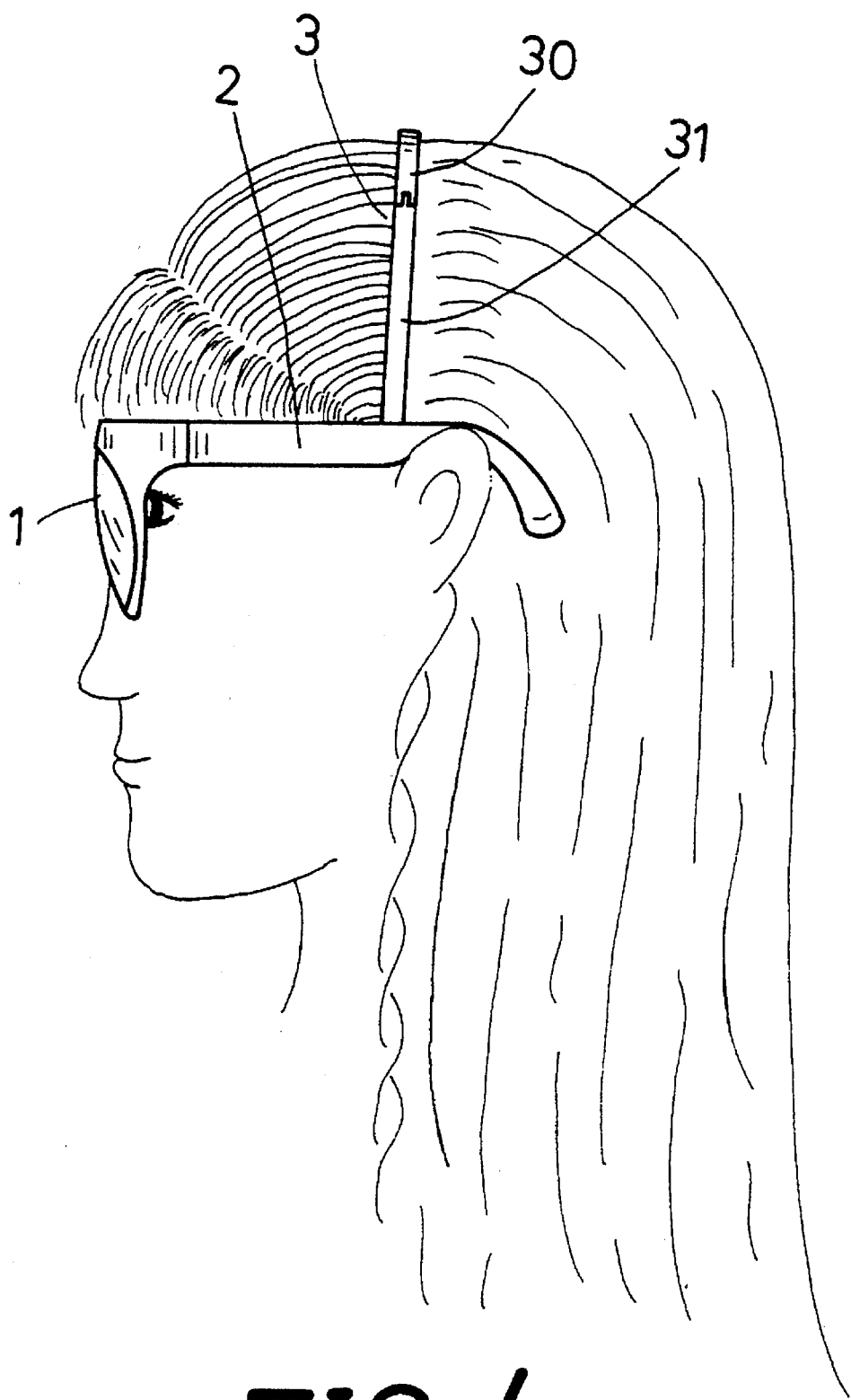
FIG. 4 is a side view of the eyeglasses with a hair clip in the present invention, showing it being practically used.

In using, referring to FIGS. 3 and 4, the front arm 30 of the hair clip set 3 can be lifted and swung up from the recess 10, with the two side arms 31, 31 also swung up with the screws Q, Q as pivots. After a user wears the glasses, she holds manually the hair clip set 3 and lifts it up curvingly, and swinging up and placing it on her hairs so that the hair clip set 3 may protect hairs from blown to be dishevelled, without need to carry an extra hair clip. Then this pair of eyeglasses has two functions of eyeglasses and a hair clip. Besides, the two side arms 31, 31 of the hair clip set 3 can be folded together with the two temples 2, 2 in case of not wearing the eyeglasses.

This invention has advantages as follows, as can be understood from the above description.

1. A user does not need to carry a pair of separate eyeglasses and a separate hair clip.
2. Its assemblage is easy, and its use is simple and convenient.

What is claimed is:

1. A pair of eyeglasses with a hair clip comprising:

a lens frame;

two temples pivotally combined with two ends of said lens frame;

wherein characterized by said lens frame having a lengthwise recess on its upper edge, two temples respectively having a lengthwise recess in an upper inner edge, a detachable hair clip set consisting of a front elongate curved arm and two side arms, said front arm and said two side arms combined with said lens frame and said two temples and received respectively in said frame lengthwise recess and said temple lengthwise recesses, said two side arms having their rear ends pivotally connected with said two temples, and said hair clip set able to be swung up curvingly with said pivots connecting the rear ends of said two side arms with said two temples so that said front arm and said two side arms may be swung up to be positioned on the hairs of the head of a user, protecting them from blown to be dishevelled.

2. The pair of eyeglasses with a hair clip as claimed in claim 1, wherein said hair clip set are combined together by means of an aperture defined by two projections at each of two ends of said front arm, a vertical hole in each of said two projections, a projection with a vertical hole provided at a front end of each of said two side arms to fit in each said aperture of said front arm, and screws screwing through said vertical holes of said front arm and said two side arms and combining both said front arm and said two side arms together.

* * * * *